(12) United States Patent
Yaoyama

(10) Patent No.: US 12,468,372 B2
(45) Date of Patent: Nov. 11, 2025

(54) POWER SUPPLY DEVICE AND DISPLAY APPARATUS

(71) Applicant: Takahiro Yaoyama, Tokyo (JP)

(72) Inventor: Takahiro Yaoyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 106 days.

(21) Appl. No.: 18/303,142

(22) Filed: Apr. 19, 2023

(65) Prior Publication Data

US 2023/0400906 A1 Dec. 14, 2023

(30) Foreign Application Priority Data

Jun. 13, 2022 (JP) .................................. 2022-095345

(51) Int. Cl.
*G06F 1/3234* (2019.01)

(52) U.S. Cl.
CPC .................................. *G06F 1/3243* (2013.01)

(58) Field of Classification Search
CPC .............................. G06F 1/3231; G06F 1/3243
See application file for complete search history.

(56) References Cited

U.S. PATENT DOCUMENTS

| | | | |
|---|---|---|---|
| 10,856,777 B2* | 12/2020 | Li | A61B 5/7278 |
| 2009/0219560 A1 | 9/2009 | Yaoyama | |
| 2011/0296163 A1* | 12/2011 | Abernethy | G06F 1/3203 |
| | | | 713/100 |
| 2012/0110286 A1 | 5/2012 | Yaoyama | |
| 2014/0376020 A1* | 12/2014 | Imamura | G03G 15/5004 |
| | | | 358/1.13 |
| 2017/0010654 A1* | 1/2017 | Chen | G06F 1/3265 |
| 2017/0269725 A1* | 9/2017 | Kang | G06F 1/3218 |
| 2021/0311539 A1* | 10/2021 | Goto | G06F 1/3231 |
| 2021/0335108 A1* | 10/2021 | Ewing | G08B 13/1445 |
| 2022/0294918 A1* | 9/2022 | Kyogoku | H04N 1/00323 |

FOREIGN PATENT DOCUMENTS

| | | |
|---|---|---|
| JP | 2013-080114 | 5/2013 |
| JP | 2021-166040 | 10/2021 |

* cited by examiner

*Primary Examiner* — Hyun Soo Kim
(74) *Attorney, Agent, or Firm* — IPUSA, PLLC

(57) ABSTRACT

A power supply device includes circuitry to supply power to an information processing apparatus, acquire a detection result of a person by a sensor disposed at the information processing apparatus, output a first determination result indicating whether a first condition is satisfied, and output a second determination result indicating whether a second condition is satisfied. When the detection result indicates that a person is detected in a state where the information processing apparatus is in a power saving mode, the circuitry cancels the power saving mode based on the first determination result and the second determination result. In the power saving mode, the power supplied to the information processing apparatus is reduced as compared with a normal mode. The first condition relates to an operation receivable by the information processing apparatus, and the second condition relates to a situation around the information processing apparatus.

4 Claims, 7 Drawing Sheets

POWER SUPPLY DEVICE AND DISPLAY APPARATUS

CROSS-REFERENCE TO RELATED APPLICATIONS

This patent application is based on and claims priority pursuant to 35 U.S.C. § 119(a) to Japanese Patent Application No. 2022-095345, filed on Jun. 13, 2022, in the Japan Patent Office, the entire disclosure of which is hereby incorporated by reference herein.

BACKGROUND

Technical Field

The present disclosure relates to a power supply device and a display apparatus.

Related Art

For power supply devices, there is a technique for changing a method of supplying electric power depending on the situation. For example, there is a device having a normal mode and a power saving mode in which power consumption is reduced as compared with the normal mode.

For this reason, there is a technique for switching modes based on the result of human detection using a human presence sensor. Relating to the switching modes based on the result of human detection, there are techniques for a display apparatus in a state set to a power saving mode. The technique is for disabling the switching based on the detection result of the human presence sensor for a certain period of time so as to inhibit the power saving mode from being immediately canceled in accordance with the result of human detection. For example, there is a technique for disabling the mode switching for a certain period starting from the detection of a person in a case where a human presence sensor detects the person.

SUMMARY

In one aspect, a power supply device includes circuitry to supply power to an information processing apparatus, acquire a detection result of a person by a sensor disposed at the information processing apparatus, output a first determination result indicating whether a first condition is satisfied, and output a second determination result indicating whether a second condition is satisfied. In a case where the detection result indicates that a person is detected in a state where the information processing apparatus is in a power saving mode, the circuitry cancels the power saving mode based on the first determination result and the second determination result. In the power saving mode, the power supplied to the information processing apparatus is reduced as compared with a normal mode. The first condition relates to an operation receivable by the information processing apparatus, and the second condition relates to a situation around the information processing apparatus.

In another aspect, a display apparatus includes a display and circuitry. The circuitry supplies power to the display, acquires a detection result of a person by a sensor disposed at the display, outputs a first determination result indicating whether a first condition is satisfied, and outputs a second determination result indicating whether a second condition is satisfied. In a case where the detection result indicates that a person is detected in a state where the display apparatus is in a power saving mode, the circuitry cancels the power saving mode based on the first determination result and the second determination result. The first condition relates to an operation receivable by the display apparatus, and the second condition relates to a situation around the display apparatus. In the power saving mode, the power supplied to the display is reduced as compared with a normal mode.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
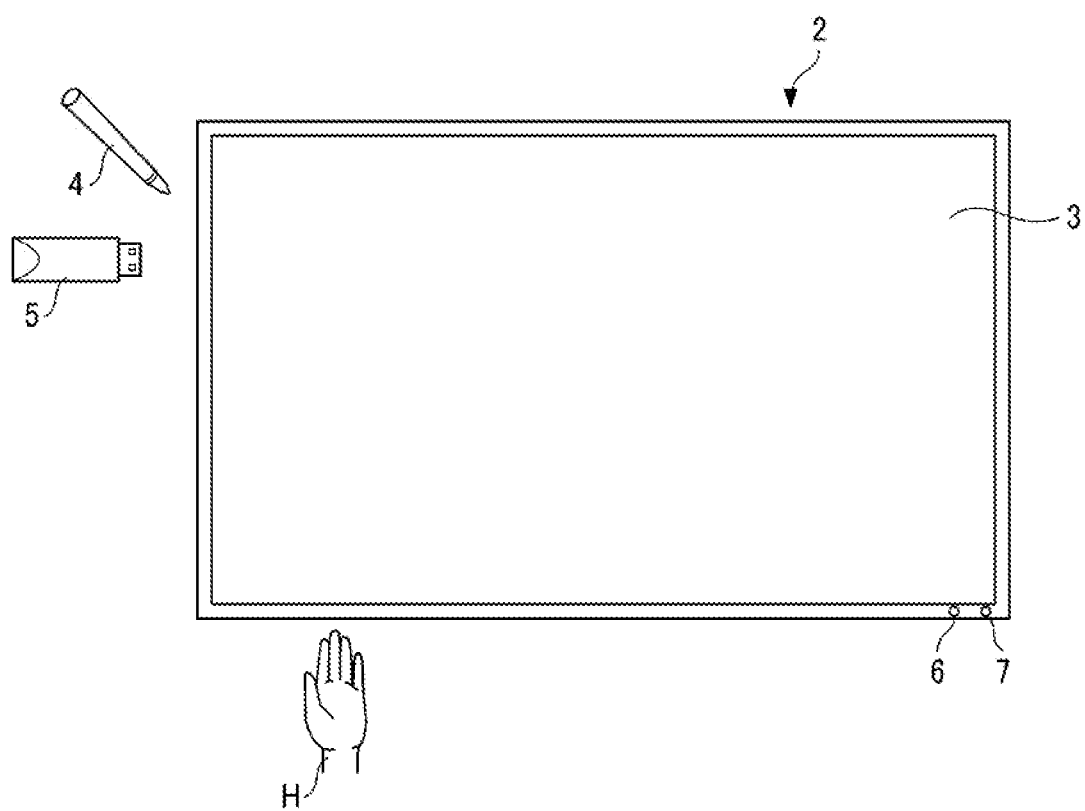
FIG. 1 is a diagram illustrating an exterior of a display apparatus according to one embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a description is given of a display apparatus having a power supply device according to the present embodiment. The display apparatus according to the present embodiment is, for example, an electronic whiteboard to receive, from a user, an input of characters and figures with an electronic pen or the like.

FIG. 1 is a diagram illustrating an exterior of the display apparatus according to the present embodiment. A display apparatus 2 illustrated in FIG. 1 is an example, and a plurality of display apparatuses may be used in combination.

In addition, the display apparatus 2 may be connected to a communication network (not) to communicate with an external device. The display apparatus 2 according to the present embodiment includes a display 3 with a touch sensor (an example of a display).

Specifically, since the display apparatus 2 includes the display 3 having the touch sensor, the display apparatus 2 can receive a stroke drawn by an event input, with an electronic pen 4, to the display 3 having the touch sensor and display an image of the stroke (stroke image) on the display 3 having the touch sensor. The event is, for example, an operation such as touching the display 3 with the tip or bottom of the electronic pen 4. In this specification, an image representing characters, shapes, numbers, symbols, lines or a combination thereof that are hand drafted by the user to the display apparatus 2 (e.g., electronic whiteboard) may be called a "stroke image."

Further, the display apparatus 2 may change an image being displayed on the display 3 according to an event (for example, the user's gesture indicating size enlargement, size reduction, or page turning) generated by a user's hand H, in alternative to the electronic pen 4.

To the display apparatus 2, a universal serial bus (USB) memory 5 is connectable. When connected to the USB memory 5, the display apparatus 2 reads an electronic file in a format such as a portable document format (PDF) from the USB memory 5 or stores an electronic file in the USB memory 5.

The display apparatus 2 includes a connector compatible with a standard such as DisplayPort, Digital Visual Interface (DVI), High-Definition Multimedia Interface (HDMI), and Video Graphics Array (VGA). Therefore, a laptop computer or the like can be connected to the display apparatus 2 via a cable.

The display apparatus 2 further includes a power switch 7 and a human presence sensor 6.

The power switch 7 is for turning on or off the power of the display apparatus 2. The display apparatus 2 can turn on and off in accordance with an input from the user to the power switch 7. When the power is turned on, the display apparatus 2 starts an application program. Thereafter, the display apparatus 2 can perform processing corresponding to the operation input from the user.

The human presence sensor 6 is a sensor that detects the presence or absence of a person. For example, the human presence sensor 6 detects a person using infrared rays. That is, infrared rays are emitted depending on the temperature of a human (person) or animal. The human presence sensor 6 detects a person by sensing infrared rays emitted from the person. The human presence sensor 6 according to the present embodiment can detect a plurality of persons present around the display apparatus 2.

The method that the human presence sensor 6 adopts is not limited to the infrared-based method. For example, the human presence sensor 6 may use a face authentication technology to detect whether there is a person in an image taken by a camera, to determine the presence or absence of the person.

Alternatively, the human presence sensor 6 may detect a person by acquiring sound, temperature, vibration, or a detection result from an external device, or a combination thereof.

In the following, a description is given of an example in which an electronic whiteboard is used as the display apparatus 2. However, a display apparatus including the power supply device may be any display apparatus not limited to the electronic whiteboard. Other examples of the display apparatus 2 include an electronic signboard (digital signage), a telestrator that is used, for example, in sports and weather broadcasts, and a remote image (video) diagnostic apparatus.

In the description below, the USB memory 5 is an example of a recording medium connectable to the display apparatus 2. However, the recording medium is not limited thereto. For example, the recording medium may be another type of recording medium such as a Secure Digital (SD) card.

Hardware Configuration of Display Apparatus

Hereinafter, a description is given of an example of a hardware configuration of the display apparatus according to the present embodiment.

Figure 2:
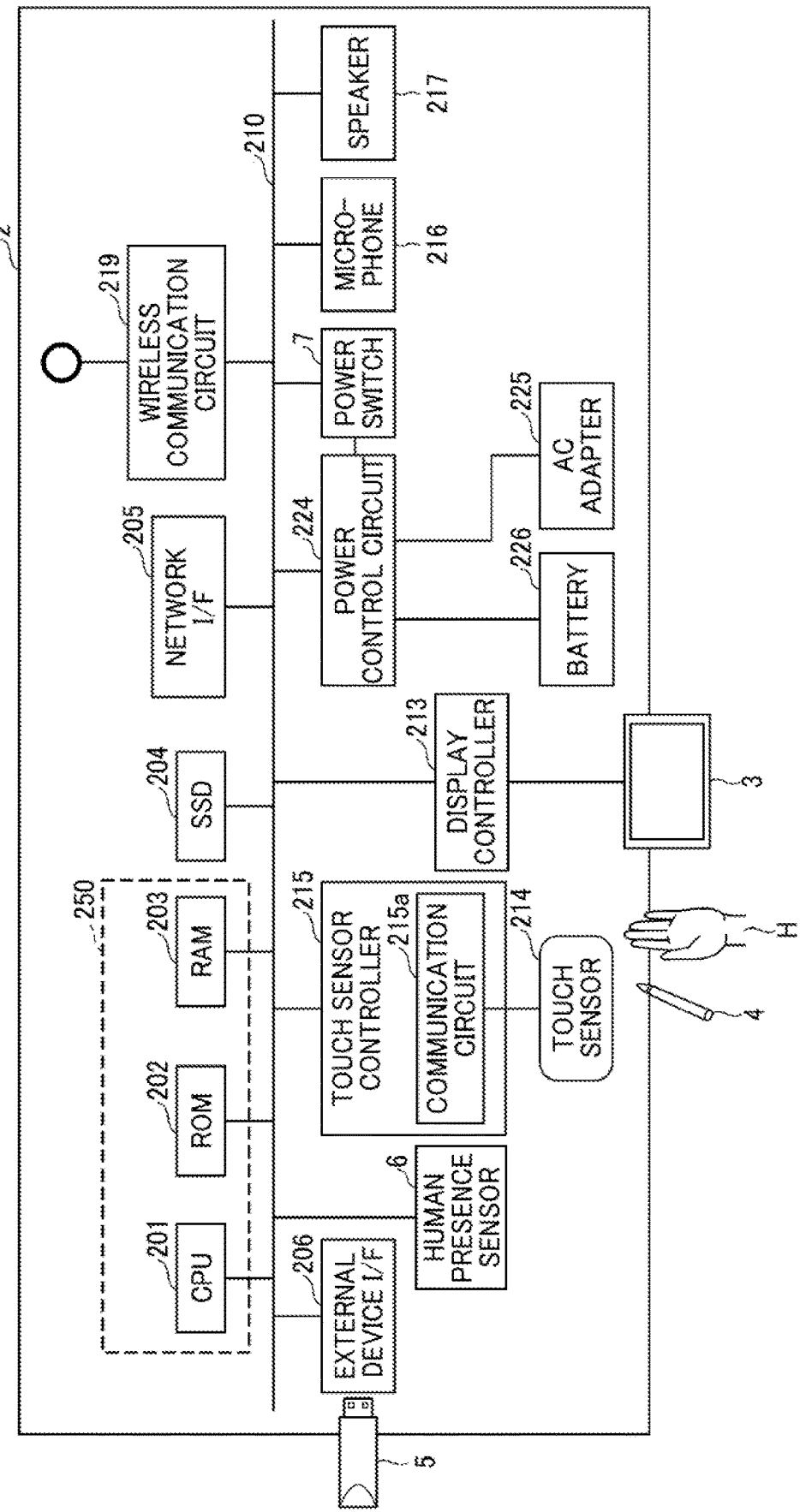
FIG. 2 is a block diagram illustrating an example of a hardware configuration of the display apparatus according to one embodiment.

FIG. 2 is a block diagram illustrating an example of the hardware configuration of the display apparatus 2 according to the present embodiment. As illustrated in FIG. 2, the display apparatus 2 includes a central processing unit (CPU) 201, a read only memory (ROM) 202, a random access memory (RAM) 203, and a solid state drive (SSD) 204.

The CPU 201 performs an operation in accordance with an input instruction. The ROM 202 stores a control program such as an initial program loader (IPL) to boot the CPU 201. The RAM 203 is used as a work area for the CPU 201.

In the present embodiment, the combination of the CPU 201, the ROM 202, and the RAM 203 implements a control unit 250. The control unit 250 controls the entire display apparatus 2.

Note that, in the present embodiment, the hardware configuration of the control unit 250 is not limited to that described above, and some or all of the functions of the control unit 250 may be implemented by one or more processing circuits. The processing circuit includes an electronic circuit such as the above-described CPU, an application specific integrated circuit (ASIC), and a field programmable gate array (FPGA), and a device such as a conventional circuit module.

The SSD 204 stores various data such as an operating system (OS) and a control program for the display apparatus 2, but such data may be stored in the ROM 202. The program may be an application program that runs on an information processing apparatus equipped with a general-purpose operating system (OS) such as WINDOWS, MAC OS, ANDROID, and IOS. That is, the display apparatus 2 may be an information processing apparatus.

The display apparatus 2 includes a network interface (IF) 205 that controls communication via a communication network, and an external device interface (UF) 206 that controls communication with an external device such as the USB memory 5 externally attached to the display apparatus 2.

The display apparatus 2 further includes the human presence sensor 6, the power switch 7, a display controller 213, a touch sensor 214, a touch sensor controller 215, a microphone 216, a speaker 217, a wireless communication circuit 219, a power control circuit 224, an alternating current (AC) adapter 225, and a battery 226. The configurations of the human presence sensor 6 and the power switch 7 are described above with reference to FIG. 1.

The display controller 213 controls screen display for outputting an image to the display 3.

The touch sensor 214 detects a touch of the electronic pen 4 or the user's hand H onto the display 3. The electronic pen 4 and the user's hand are examples of an input device.

The touch sensor controller 215 controls processing of the touch sensor 214. Specifically, the touch sensor 214 uses an infrared blocking method to detect a touch input onto the display 3 and determine the coordinates to which the touch is input. To detect the touch input and determine the coordinates of the touched position, two light receiving and emitting devices, disposed on both upper side ends of the display 3, emit a plurality of infrared rays in parallel to a surface of the display 3. Then, the emitted infrared rays are reflected by a reflector frame surrounding the sides of the display 3. Light-receiving elements receive light passing an optical path same as the optical path of the emitted infrared rays, which are reflected by the reflector frame.

The touch sensor 214 outputs an identifier (ID) of the infrared ray that is blocked by an object after being emitted from the two light receiving and emitting devices, to the touch sensor controller 215. Based on the ID of the infrared ray, the touch sensor controller 215 detects specific coordinates of the position touched by the object. In the present embodiment, the method of determining the coordinates of the position touched by the object is not limited to the example using two light receiving and emitting devices. Alternatively, for example, the coordinates may be determined using a touch panel.

The touch sensor controller 215 includes a communication circuit 215a. The communication circuit 215a wirelessly communicates with the electronic pen 4. For example, the communication circuit 215a receives a pen ID for identifying the electronic pen 4. For example, when the communication circuit 215a performs the communication in compliance with communications protocols such as BLUETOOTH, a commercially available pen can be used as the electronic pen 4. One or more electronic pens 4 may be registered in advance in the communication circuit 215a. When the electronic pen 4 is registered, the electronic pen 4 can communicate with the display apparatus 2 without a connection setting operation by the user.

The method that the touch sensor 214 adopts is not limited to the infrared blocking method. For example, the touch sensor 214 may use a capacitive touch panel that identifies the touched position by detecting a change in capacitance. The touch sensor 214 may be a resistive-film touch panel that determines the touched position based on a change in voltage of two opposing resistive films. Alternatively, for example, the touch sensor 214 may use an electromagnetic induction touch panel, which detects electromagnetic induction caused by contact of an object to a display, to determine the touched position.

The touch sensor 214 can be of a type that does not require an electronic pen to detect whether a pen tip is in contact with the display. In this case, a fingertip or a pen-shaped stick is used for touch operation. Note that the electronic pen 4 does not necessarily have an elongated pen shape.

The microphone 216 is used for inputting sounds. The speaker 217 is used for outputting sounds.

The wireless communication circuit 219 communicates with a communication terminal carried by a user and relays the connection to the Internet, for example. The wireless communication circuit 219 performs communication in compliance with WI-FI, BLUETOOTH or the like, but the communications protocols are not limited thereto. The wireless communication circuit 219 forms an access point. When a user sets a service set identifier (SSID) and a password that the user obtains in advance to the communication terminal carried by the user, the communication terminal is connected to the access point.

The wireless communication circuit 219 may include two or more access points. For example, the following two access points are conceivable.

(a) A first access point to the Internet; and (b) a second access point to an intra-company network to the Internet.

The first access point (a) is for users other than, for example, company staff. The first access point (a) does not allow access from such users to the intra-company network, but allows access to the Internet. On the other hand, the second access point (b) is for intra-company users. The second access point (b) allows the users to access to the intra-company network and the Internet.

The power control circuit 224 controls the AC adapter 225 and the battery 226, which are power supplies for the display apparatus 2. The AC adapter 225 converts an alternating current supplied by a commercial power supply into a direct current. In the present embodiment, a combination of the power control circuit 224 and one or both of the AC adapter 225 and the battery 226 functions as a power supply unit 200 (in FIG. 3). For example, the power control circuit 224 supplies power from the AC adapter 225 or the battery 226 to the entire display apparatus 2.

In the present embodiment, power is supplied to the display apparatus 2, but the power supply destination is not limited to the display apparatus 2 but may be any information processing apparatus that consumes the power.

In a case where the display 3 is a so-called electronic paper, after an image is drawn, the display 3 consumes little or no power to keep displaying the image. In such case, the display apparatus 2 may be driven by the battery 226. With this structure, the display apparatus 2 is usable as, for example, digital signage used in an outdoor location, where connecting to a power supply is not easy.

The display apparatus 2 further includes a bus line 210. The bus line 210 is an address bus or a data bus that electrically connects the elements illustrated in FIG. 3, such as the CPU 201, to each other.

Functional Configuration

Figure 3:
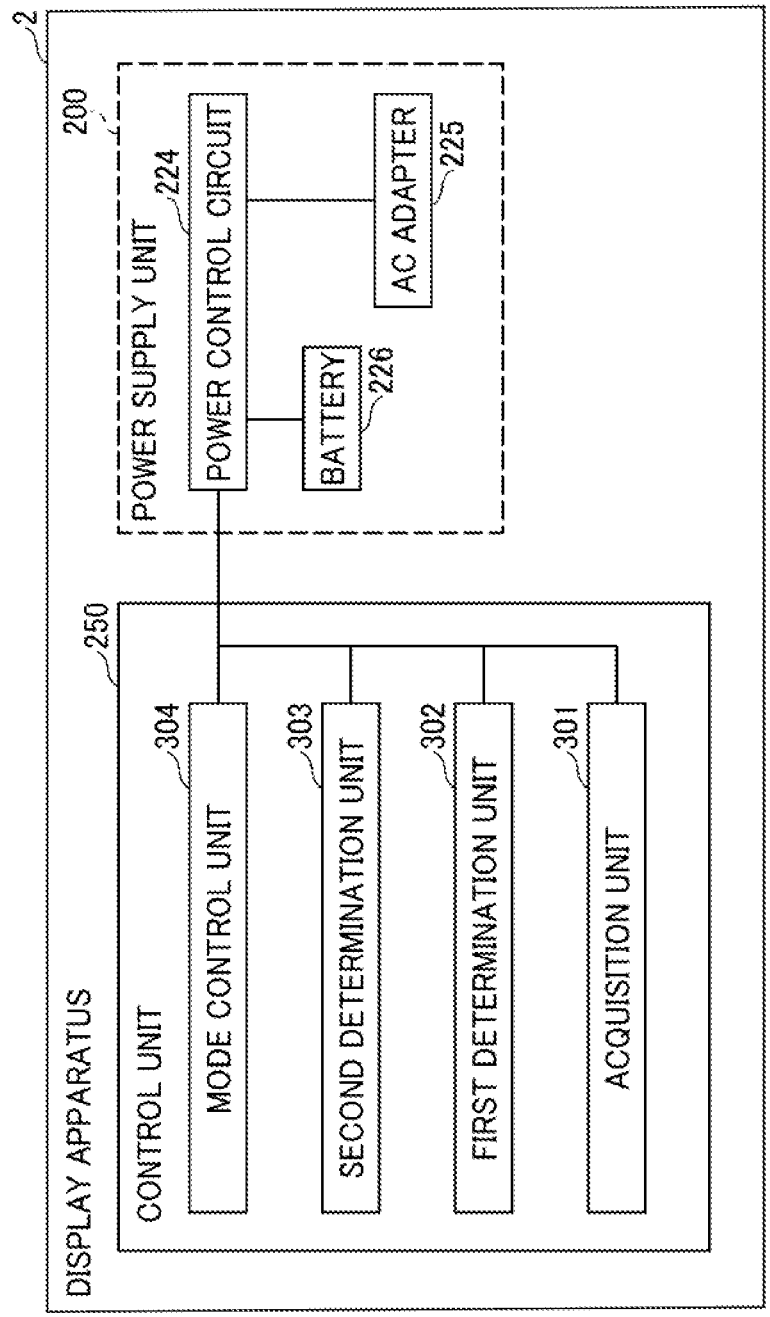
FIG. 3 is a block diagram illustrating an example of functions, divided into blocks, of the display apparatus according to one embodiment.

A description is now given of a functional configuration of the display apparatus 2 according to the present embodiment, with reference to FIG. 3. FIG. 3 is a block diagram illustrating an example of the functions, divided into blocks, of the display apparatus 2 according to the present embodiment. The display apparatus 2 functions as an information processing apparatus that executes information processing. Further, the display apparatus 2 functions as a power supply device that controls the consumption of power supplied by the power supply unit 200 implemented by the combination of the power control circuit 224 and one or both of the AC adapter 225 and the battery 226.

The control unit 250 of the display apparatus 2 includes, for example, an acquisition unit 301, a first determination unit 302, a second determination unit 303, and a mode control unit 304 as functional units implemented by the CPU 201 executing one or more programs installed in the SSD 204.

The mode control unit 304 controls the mode related to the display apparatus 2 (an example of a control unit). For example, the mode control unit 304 switches the mode in which the display apparatus 2 operates. The mode control unit 304 according to the present embodiment can switch the mode by transmitting a signal to the power control circuit 224. In addition, the mode control unit 304 controls the display apparatus 2 in accordance with the currently set mode.

The display apparatus 2 according to the present embodiment has a normal mode and a power saving mode as switchable modes.

The normal mode is a mode for a normal operation of the display apparatus 2.

The power saving mode is a mode in which power supplied to the display apparatus 2 is reduced as compared with the normal mode. In the power saving mode according to the present embodiment, the display of the display 3 is turned off to reduce the power. The power control in the power saving mode is not limited to turning off the display 3 but may be any control to reduce the power consumption. For example, only backlight of the display 3 may be turned off in the power saving mode. The factor for switching between the power saving mode and the normal mode is not limited to whether the display 3 is used. In other words, the power saving mode is a state in which less power is consumed compared with the power consumption in the normal mode. Therefore, aspects of the present disclosure are applicable to any device that performs power control such that the power supply is cut off or reduced in the power saving mode.

For example, the mode control unit 304 performs the switching from the normal mode to the power saving mode in accordance with, for example, an operation received by the touch sensor 214 or any of various buttons of the display apparatus 2. The operation received by the touch sensor 214 is, for example, pressing an icon displayed on the display 3, for switching to the power saving mode. The operation of the various buttons is, for example, pressing a button for turning off the display 3.

The acquisition unit 301 acquires signals from various sensors provided in the display apparatus 2. For example, the acquisition unit 301 acquires a signal indicating a detection result of a person by the human presence sensor 6 (an example of a detection unit) of the display apparatus 2.

The first determination unit 302 determines whether or not a first condition is satisfied and outputs a first determination result to the mode control unit 304. The first condition is a condition related to an operation receivable by the display apparatus 2 (an example of the information processing apparatus). In the present embodiment, the first determination unit 302 determines that the first condition is satisfied in a case where the time starting from the switching of the display apparatus 2 to the power saving mode based on an operation received from the user exceeds an inactive period T1 (see FIG. 4, an example of a first length of time). In the example described in the present embodiment, the first condition is whether the predetermined time has elapsed from the reception of the operation for switching to the power saving mode, but the first condition is not limited thereto. The first condition may be, for example, a condition related to an operation from the user.

Figure 6:
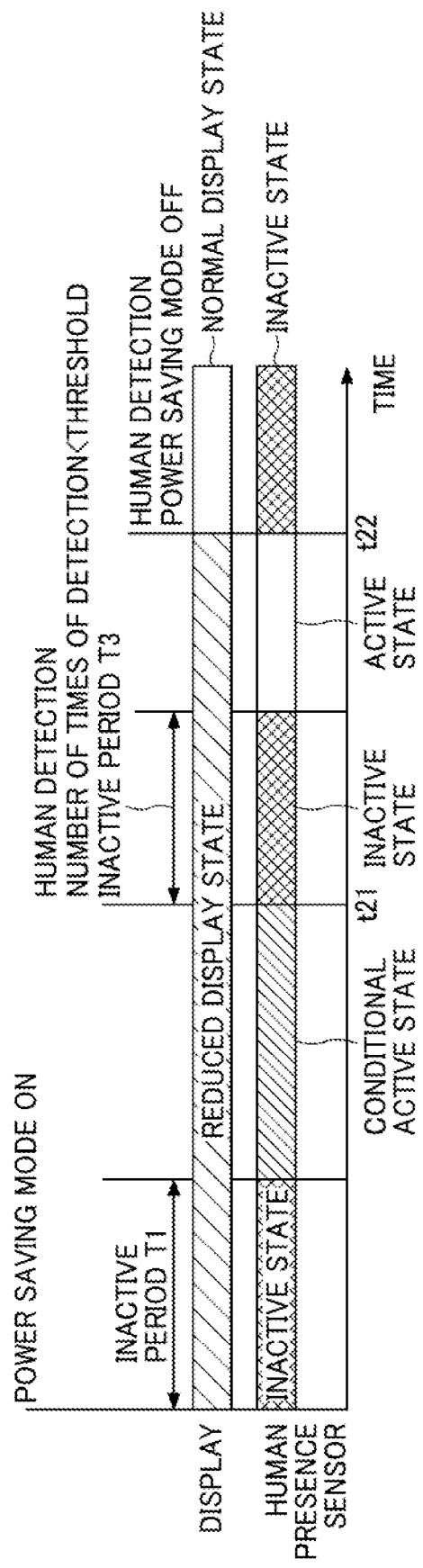
FIG. 6 is another diagram illustrating state changes of the elements of the display apparatus in the power saving mode, according to one embodiment.

The first determination unit 302 according to the present embodiment further determines whether or not the time from the start of time counting exceeds an inactive period T3 (see FIG. 6, an example of a third length of time). The trigger for starting the time counting will be described later.

The inactive period T1 (an example of the first length of time) and the inactive period T3 (an example of the third length of time) are time periods during which the human presence sensor 6 does not detect a person. The inactive periods T1 and T3 are, for example, periods set in advance by the user and are stored in, for example, the SSD 204. It is desirable that the inactive periods T1 and T3 are set to be equal to or longer than an estimated time for the person who has input the operation to switch to the power saving mode to move out a detection span of the human presence sensor 6 after input of the operation. Simultaneously, the inactive periods T1 and T3 are desirably not too long.

If the time is shorter than 10 seconds, the person who has input the operation for switching to the power saving mode is likely to be still nearby. When the inactive periods T1 and T3 are set to 10 seconds or greater, the person who has input the operation for switching to the power saving mode can be prevented from being detected again by the human presence sensor 6 after input of the operation. If the inactive periods T1 and T3 are too long, the next user may not be able to use the display apparatus 2 immediately. Therefore, it is desirable that the inactive periods T1 and T3 are shorter than about 60 seconds.

Accordingly, it is desirable that the inactive periods T1 and T3 are set to about 10 to seconds.

Such inactive periods T1 and T3 can prevent unwanted detection of the person who has input the operation for switching to the power saving mode while allowing the next user to use the display apparatus 2 immediately.

However, the optimum value of the inactive periods T1 and T3 differs depending on conditions such as the range in which the human presence sensor 6 detects a person, the location where the display apparatus 2 is installed, and the size of the room where the display apparatus 2 is installed. Thus, the inactive periods T1 and T3 are set in consideration of the setting of the human presence sensor 6 and the environment where the display apparatus 2 is provided. The above-mentioned period of about 10 to 60 seconds is a setting for a general meeting room.

The second determination unit 303 determines whether or not a second condition is satisfied and outputs a second determination result to the mode control unit 304. The second condition is a condition related to a situation around the display apparatus 2 (an example of the information processing apparatus). The second determination unit 303 according to the present embodiment determines that the second condition is satisfied in a case where the number of times of detection of human movement by the human presence sensor 6 per unit time (an example of a second length of time) is greater than a threshold value. In the example described in the present embodiment, the second condition is whether the number of times of detection of human movement by the human presence sensor 6 per unit time (an example of the second length of time) is greater than the threshold value, but the second condition is not limited thereto. The second condition is, for example, a detection result of a sensor provided in the display apparatus 2 to detect a situation around the display apparatus 2. Note that the unit time (an example of the second length of time) is a time determined for detecting human movement and is determined in accordance with, for example, the performance of the human presence sensor 6.

The number of times of detection of human movement by the human presence sensor 6 may correspond to, for example, the number of persons present around the display apparatus 2 (an example of the information processing apparatus). In other words, the situation where the number of times of detection of human movement is greater than the threshold value is considered to be the situation where the number of persons detected by the human presence sensor 6 is greater than the predetermined threshold, and the second condition is satisfied in such a situation.

In a case where the detection result by human presence sensor 6 indicates the presence of a person after the switching to the power saving mode, the mode control unit 304 determines whether or not to cancel the power saving mode based on the first determination result input from the first determination unit 302 and the second determination result input from the second determination unit 303.

The mode control unit 304 according to the present embodiment cancels the power saving mode when determining that the first condition is satisfied based on the first determination result and that the second condition is satisfied based on the second determination result.

That is, the mode control unit 304 cancels the power saving mode when the elapsed time from the switching to the power saving mode exceeds the inactive period T1 (an example of the first length of time) and the number of persons detected by the human presence sensor 6 is greater than the threshold value (for example, 2). In the present embodiment, the human presence sensor 6 starts the detection after the lapse of the inactive period T1 (an example of the first length of time) from the switching to the power saving mode (after the first condition is determined as being satisfied). Then, the mode control unit 304 cancels the power saving mode when the number of persons (the number of movements) detected by the human presence sensor 6 is greater than the threshold value (for example, 2).

Figure 4:
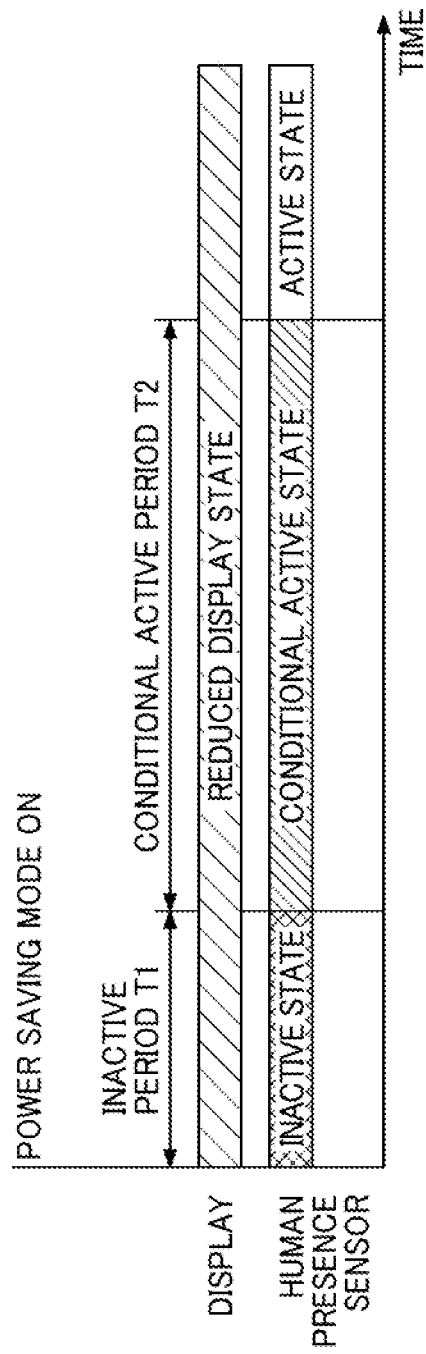
FIG. 4 is a diagram illustrating state changes of elements of the display apparatus in a power saving mode, according to one embodiment.

Next, a description is given of a first example of the control performed in the display apparatus 2 in the power saving mode. FIG. 4 is a diagram illustrating state changes of the elements of the display apparatus 2 in the power saving mode. In the example illustrated in FIG. 4, the human presence sensor 6 of the display apparatus 2 does not detect a person.

As illustrated in FIG. 4, when the display apparatus 2 is set to the power saving mode (power saving mode is on), the display 3 is in a reduced display state (for example, displaying is off), and the human presence sensor 6 becomes inactive and does not perform the detection for the inactive period T1.

After the inactive period T1 has elapsed, the human presence sensor 6 enters a conditional active state for a conditional active period T2. A description of a case where a person is detected in the conditional active state is deferred.

When the conditional active period T2 elapses without detection of a person by the human presence sensor 6, the human presence sensor 6 enters an active state. When the human presence sensor 6 in the active state detects a person, the mode control unit 304 cancels the power saving mode of the display apparatus 2. Note that the conditional active period T2 may be determined according to the actual situation.

Figure 5:
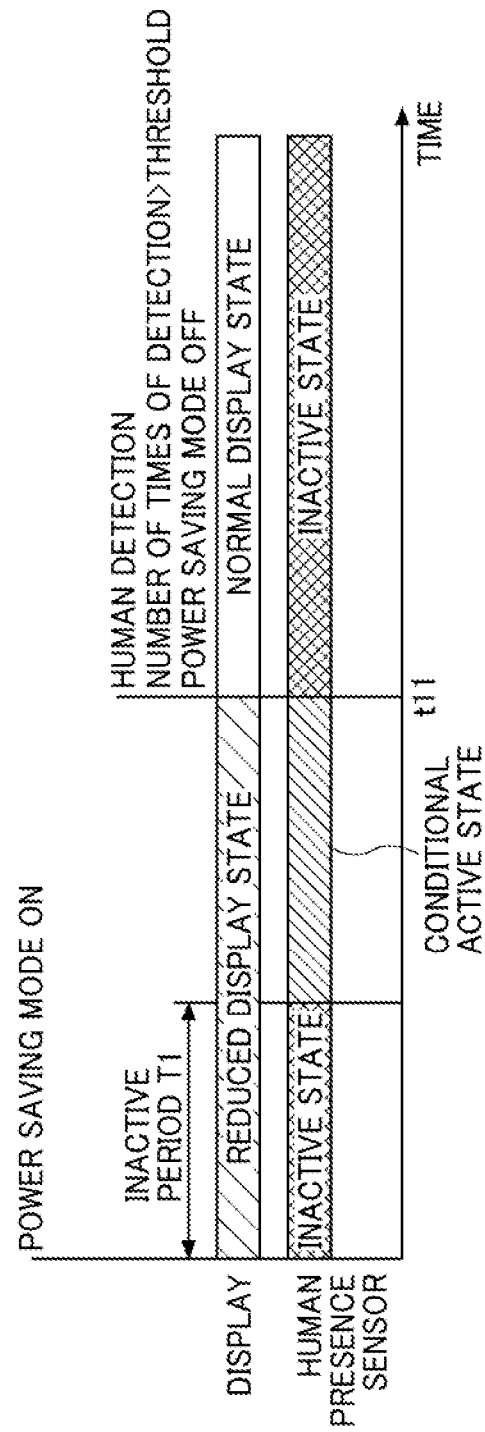
FIG. 5 is another diagram illustrating state changes of the elements of the display apparatus in the power saving mode, according to one embodiment.

Next, a description is given of a second example of the control performed in the display apparatus 2 in the power saving mode. FIG. 5 is another diagram illustrating state changes of the elements of the display apparatus 2 in the power saving mode. In the example illustrated in FIG. 5, the human presence sensor 6 of the display apparatus 2 detects a person at a time tn.

First, as in FIG. 4, when the display apparatus 2 is set to the power saving mode, the display 3 enters the reduced display state (for example, displaying is off), and the human presence sensor 6 becomes inactive and does not perform the detection for the inactive period T1.

After the inactive period T1 has elapsed, the human presence sensor 6 enters the conditional active state. The human presence sensor 6 detects a person at the time t11 at which the human presence sensor 6 is in the conditional active state.

In the example illustrated in FIG. 5, at the time t11, the second determination unit 303 determines that the number of times of detection (the number of persons detected) by the human presence sensor 6 is greater than the threshold value. In this case, the mode control unit 304 cancels the power saving mode based on the determination result. As a result, the display 3 enters a normal display state (for example, displaying is on). After the power saving mode is canceled, the human presence sensor 6 becomes inactive and does not perform the detection.

In the example illustrated in FIG. 5, while the human presence sensor 6 is in the conditional active state, the number of times of detection by the human presence sensor 6, in other words, the number of detected persons, is greater than the threshold value. In such a case, the power saving mode of the display apparatus 2 is canceled. In other words, the display apparatus 2 determines that work using the display apparatus 2 is performed since there are many people around the display apparatus 2, and the power saving mode is canceled.

Next, a description is given of a third example of the control performed in the display apparatus 2 in the power saving mode. FIG. 6 is another diagram illustrating state changes of the elements of the display apparatus 2 in the power saving mode. In the example illustrated in FIG. 6, the human presence sensor 6 of the display apparatus 2 detects a person at a time t21.

First, as in FIG. 4, when the display apparatus 2 is set to the power saving mode, the display 3 enters the reduced display state (for example, displaying is off), and the human presence sensor 6 becomes inactive and does not perform the detection for the inactive period T1.

After the inactive period T1 has elapsed, the human presence sensor 6 enters the conditional active state. The human presence sensor 6 detects a person at the time t21 at which the human presence sensor 6 is in the conditional active state.

In the example illustrated in FIG. 6, the second determination unit 303 determines that the number of times of detection by the human presence sensor 6 is equal to or less than the threshold value. In this case, the mode control unit 304 maintains the power saving mode based on the determination result. Accordingly, the display 3 is kept in the reduced display state (for example, displaying is off). The human presence sensor 6 is inactive and does not perform the detection for the inactive period T3 (an example of the third length of time). The inactive period T3 may have the same length as the inactive period T1 or may have a different length therefrom.

After the inactive period T3 has elapsed, the human presence sensor 6 enters the active state. When the human presence sensor 6 in the active state detects a person, the power saving mode is canceled regardless of the number of detected persons.

In the example illustrated in FIG. 6, since the human presence sensor 6 detects a person at the time t22, the mode control unit 304 cancels the power saving mode. As a result, the display 3 enters the normal display state (for example, displaying is on). After the power saving mode is canceled, the human presence sensor 6 becomes inactive and does not perform the detection.

In the example illustrated in FIG. 6, while the human presence sensor 6 is in the conditional active state, at the time t21, the number of times of detection by the human presence sensor 6, in other words, the number of detected persons, is equal to or less than the threshold value. In such a case, the display apparatus 2 is kept in the power saving mode, and the human presence sensor 6 becomes inactive again. In other words, the display apparatus 2 determines, at the time t21, that the situation when the power saving mode is set continues since there are few people around the display apparatus 2, and the power saving mode is maintained.

Overall Operation

A description is given below of a sequence of overall operation performed by the display apparatus 2 according to the present embodiment.

Figure 7:
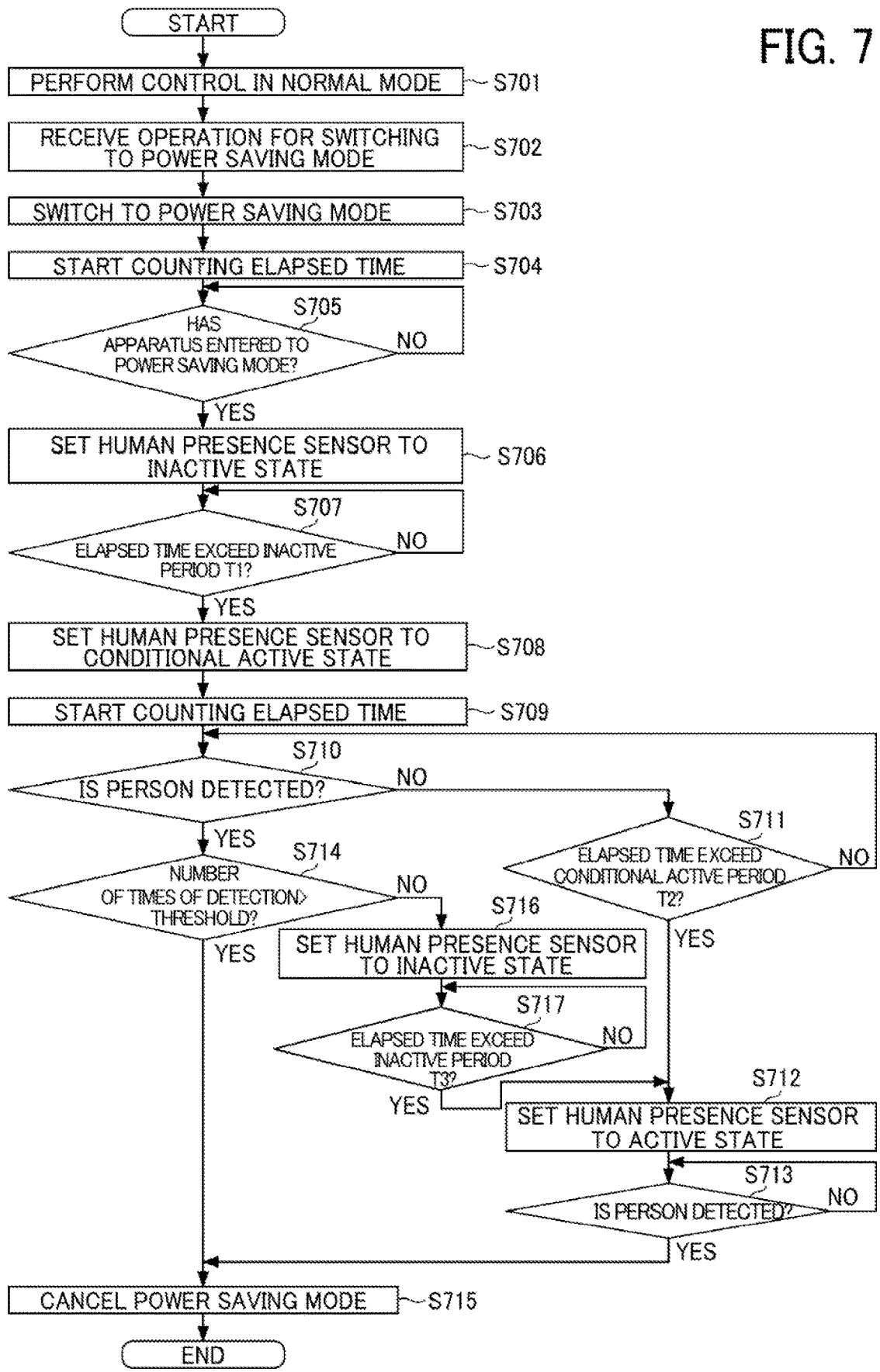
FIG. 7 is a flowchart illustrating a sequence of overall operation performed by the display apparatus according to one embodiment.

FIG. 7 is a flowchart illustrating the sequence of overall operation performed by the display apparatus 2 according to the present embodiment. In the example illustrated in FIG. 7, the display apparatus 2 has already been turned on.

First, the mode control unit 304 performs the control of the display apparatus 2 in the normal mode (S701). For example, the normal mode is set when the person (user) is using the display apparatus 2 at a meeting or the like.

Then, the mode control unit 304 receives an operation for switching to the power saving mode from, for example, the touch sensor 214 (S702). For example, the operation for switching to the power saving mode to turn the display 3 off is received via an interface such as a button or an icon.

Then, the mode control unit 304 proceeds to the S703 triggered by the operation.

The mode control unit 304 starts switching the display apparatus 2 to the power saving mode (S703). In the power saving mode, for example, the display 3 is turned off, to reduce the power to be supplied.

The mode control unit 304 starts counting the elapsed time (S704).

The mode control unit 304 checks whether or not the display apparatus 2 has switched to the power saving mode (for example, whether or not the display 3 has been turned off) (S705). When the display apparatus 2 has not switched to the power saving mode (S705: NO), the mode control unit 304 repeatedly checks the mode switching.

On the other hand, when determining that the display apparatus 2 has switched to the power saving mode (S705: YES), the mode control unit 304 sets the human presence sensor 6 to the inactive state (S706).

Thereafter, the first determination unit 302 determines whether or not the elapsed time has exceeded the inactive period T1 (S707). When determining that the elapsed time has not exceeded the inactive period T1 (S707: NO), the first determination unit 302 performs the determination of S707 again.

When determining that the elapsed time has exceeded the inactive period T1 (S707: YES), the first determination unit 302 outputs the determination result to the mode control unit 304. The mode control unit 304 sets the human presence sensor 6 to the conditional active state (S708).

Further, the mode control unit 304 initializes the elapsed time to "0" and then starts counting the elapsed time again (S709).

Then, the mode control unit 304 determines whether the human presence sensor 6 has detected a person based on the detection result acquired by the acquisition unit 301 (S710). If it is determined that a person has not been detected (S710: NO), the first determination unit 302 determines whether or not the elapsed time has exceeded the conditional active period T2 (S711). When the determination result is that the conditional active period T2 has not elapsed (S711: NO), the determination in S710 is performed again.

On the other hand, in a case where the first determination unit 302 determines that the elapsed time has exceeded the conditional active period T2 (S711: YES), the determination result is output to the mode control unit 304. Accordingly, the mode control unit 304 sets the human presence sensor 6 to the active state (S712).

Then, the mode control unit 304 determines whether the human presence sensor 6 has detected a person based on the detection result acquired by the acquisition unit 301 (S713).

When it is determined that a person is not detected (S713: NO), the determination is repeated until a person is detected.

On the other hand, when determining that the human presence sensor 6 has detected a person (S713: YES) based on the signal from the human presence sensor 6, indicating that a person has been detected, the mode control unit 304 cancels the power saving mode and ends the process (S715).

When it is determined that the human presence sensor 6 has detected a person in the S710 (S710: YES), the second determination unit 303 determines whether or not the number of times of detection is greater than the threshold value (S714).

When the second determination unit 303 determines that the number of times of detection is greater than the threshold value (S714: YES), the mode control unit 304 cancels the power saving mode and ends the process (S715).

On the other hand, when the second determination unit 303 determines that the number of times of detection is equal to or less than the threshold value (S714: NO), the mode control unit 304 sets the human presence sensor 6 to the inactive state (S716). At this time, the elapsed time is initialized to "0."

Thereafter, the first determination unit 302 determines whether or not the elapsed time has exceeded the inactive period T3 (S717). When determining that the elapsed time does not exceed the inactive period T3 (S717: NO), the first determination unit 302 repeats the determination until the elapsed time exceeds the inactive period T3.

On the other hand, when determining that the elapsed time has exceeded the inactive period T3 (S717: YES), the first determination unit 302 outputs the determination result to the mode control unit 304. Accordingly, the mode control unit 304 sets the human presence sensor 6 to the active state (S712). Since the subsequent process (S713 and S715) is as described above, the descriptions thereof are omitted.

A description is given of a modification of the above-described embodiment.

In the above-described embodiment, the first condition and the second condition are not limited to the above-described conditions. For example, regarding the first condition, the first determination unit 302 may determine whether or not the first condition is satisfied according to whether or not a predetermined gesture operation is received from the user.

For example, face authentication may be used to determine whether the condition is satisfied. For example, when the display apparatus 2 includes a sensor that performs face authentication, a user who performs an operation to set the display apparatus 2 to the power saving mode can be recognized. Then, the second determination unit 303 may determine that the second condition is satisfied when determining that the detection result of the face authentication indicates the detection of a user different from the user recognized at the reception of the operation. The first condition in this case may be the same as or different from that in the above-described embodiment.

The user who performs the operation for switching to the power saving mode is often the person who had finished using the display apparatus 2. Therefore, when a user different from the user who has performed the operation is detected, it can be determined that the different user is about to use the display apparatus 2 next. Therefore, the second determination unit 303 may determine that the second condition is satisfied when determining that the different user is detected.

Any other user recognition technique may be used, such as a user recognition technique based on an ID of the user.

Regarding the second condition, a user approaching the display apparatus 2 may be detected. For example, the second determination unit 303 determines whether or not there is an approaching user based on a detection result input from a sensor that measures a distance to the user. That is, it can be determined that the user who is going away has finished using the display apparatus 2, and the user who is approaching is about to start using the display apparatus 2. Therefore, the second determination unit 303 may determine that the second condition is satisfied when determining that there is an approaching user based on the detection result.

In the present modification, since the power saving mode can be canceled in accordance with the manner in how the user moves, the approaching user can immediately use the display apparatus 2. Thus, convenience can improve.

Examples of the operation mode are not limited to the two modes, namely, the normal mode and the power saving mode. The apparatus incorporating the power supply device may operate in various modes, as long as the power saving mode can be set. Further, the name of the mode may be other than the normal mode or the power saving mode. For example, the power saving mode may be a mode, such a mode called "standby mode," in which the power consumption is smaller than the mode in which the apparatus is used.

The above-described embodiment concerns the example in which the switching to the power saving mode is performed based on the operation received from the user. However, the manner of switching to the power saving mode is not limited to the manner based on the operation received from the user. For example, the display apparatus 2 may be set to enter the power saving mode at the activation of the display apparatus 2, may be switched to the power saving mode after the elapse of a predetermined time from the reception of an operation from the user, or may be switched to the power saving mode after the elapse of a predetermined time counted by a timer.

All or a part of the processing described in this disclosure may be performed by a computer operating according to a program for causing the computer to execute a method for controlling power supply. Specifically, the program is a computer program for causing a processor incorporated in, for example, a power supply device or a display apparatus, to execute the processes for controlling power supply. Therefore, in execution of the program for controlling power supply, the computer having a processor and a control circuit performs calculations and control operations according to the program to carry out the method for controlling power supply.

A storage device included in the computer stores data used in the processes according to the program so that the computer executes the processes.

The programs may be recorded in a computer-readable recording medium or carrier medium and distributed. Note that examples of the recording medium or carrier medium include, but are not limited to, a magnetic tape, a flash memory, an optical disk, a magneto-optical disk, and a magnetic disk. The programs may be distributed through a telecommunication line.

Although several examples of the embodiments of the present invention have been described above, embodiments of the present invention are not limited to the above-described embodiments. That is, various modifications and improvements can be made within the scope of the present invention.

If the mode switching based on the detection by a human presence sensor is disabled for a certain period starting from the detection of a person or the detection by the human presence sensor is disabled for a certain period to inhibit unnecessary recovery from the power saving mode, it is possible that the apparatus does not cancel the power saving mode until a next user performs an operation to switch the mode, which may be inconvenient depending on the situation.

By contrast, in the embodiment and the modification described above, the display apparatus 2 cancels the power saving mode when the first condition and the second condition are satisfied, thereby improving the convenience of the user using the display apparatus 2.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Aspects of the present disclosure are, for example, as follows.

According to Aspect 1, a power supply device includes a power supply unit to supply power to an information processing apparatus, an acquisition unit to acquire a detection result of a person by a detection unit provided at the information processing apparatus, a first determination unit, a second determination unit, and a control unit. The first determination unit determines whether or not a first condition is satisfied and outputs a first determination result. The first condition is a condition related to an operation receivable by the information processing apparatus. The second determination unit determines whether a second condition is satisfied and outputs a second determination result. The second condition is a condition related to a situation around the information processing apparatus.

In a case where the detection result indicates that a person is detected in a state where the information processing apparatus is in a power saving mode in which the power supplied to the information processing apparatus is reduced as compared with a normal mode, the control unit cancels the power saving mode based on the first determination result and the second determination result.

According to Aspect 2, in the power supply device of Aspect 1, the first determination unit determines that the first condition is satisfied when an elapsed time from switching to the power saving mode exceeds a first length of time.

According to Aspect 3, in the power supply device of Aspect 1 or 2, the second determination unit determines that the second condition is satisfied when the number of times of detection of human movement detected by the detection unit in a second length of time is greater than a threshold value.

According to Aspect 4, in the power supply device of any one of Aspects 1 to 3, the second determination unit determines that the second condition is not satisfied when the number of times of detection of human movement detected by the detection unit in the second length of time is equal to or less than the threshold value, and the control unit inhibits the detection unit from detecting a human movement for a third length of time.

According to Aspect 5, a display apparatus includes a display, a power supply unit to supply power to the display, an acquisition unit to acquire a detection result of a person by a detection unit provided at the display, a first determination unit, a second determination unit, and a control unit. The first determination unit determines whether or not a first condition is satisfied and outputs a first determination result. The first condition is a condition related to an operation receivable by the display apparatus.

The second determination unit determines whether a second condition is satisfied and outputs a second determination result. The second condition is a condition related to a situation around the display apparatus.

In a case where the detection result indicates that a person is detected in a state where the display apparatus is in a power saving mode in which the power supplied to the display is reduced as compared with a normal mode, the control unit cancels the power saving mode based on the first determination result and the second determination result.

According to Aspect 6, in the display apparatus of Aspect 5, the first determination unit determines that the first condition is satisfied when an elapsed time from switching to the power saving mode exceeds a first length of time.

According to Aspect 7, in the display apparatus of Aspect 5 or 6, the second determination unit determines that the second condition is satisfied when the number of times of detection of human movement detected by the detection unit in a second length of time is greater than a threshold value.

According to Aspect 8, in the display apparatus of any one of Aspect 5 to 7, the second determination unit determines that the second condition is not satisfied when the number of times of detection of human movement detected by the detection unit in the second length of time is equal to or less than the threshold value, and the control unit inhibits the detection unit from detecting a human movement for a third length of time.

The invention claimed is:

1. A power supply device comprising circuitry configured to:
   supply power to an information processing apparatus;
   acquire a detection result of a person by a sensor disposed at the information processing apparatus;
   output a first determination result indicating whether a first condition is satisfied, the first condition being related to an operation receivable by the information processing apparatus;
   output a second determination result indicating whether a second condition is satisfied, the second condition being related to a situation around the information processing apparatus;
   in a case where the detection result indicates that a person is detected in a state where the information processing apparatus is in a power saving mode, the power saving mode performed based on the operation received from a user, the power saving mode being a mode in which the power supplied to the information processing apparatus is reduced as compared with a normal mode;
   set the sensor to an inactive state when the information processing apparatus is switched to the power saving mode;
   determine that the first condition is satisfied based on a determination result that an elapsed time from switching to the power saving mode exceeds a first length of time;
   set the sensor to a conditional active state when the elapsed time from switching to the power saving mode exceeds the first length of time;
   determine, after setting the sensor to the conditional active state and after starting to count a second length of time, that the second condition is satisfied based on a determination result that a number of times of detection of human movement detected by the sensor is greater than a threshold value, wherein the sensor is set to the inactive state when the number of times of detection of human movement detected by the sensor after starting the second length of time is less than or equal to the threshold value;
   set the sensor to an active state when an elapsed time of the second length of time has exceeded a predetermined period in the conditional active state without detecting the person; and
   cancel, after the sensor is set to the conditional active state, the power saving mode based on the first determination result outputted after the first length of time and the second determination result outputted during the second length of time, wherein the second length of time occurs after the first length of time is elapsed.

2. The power supply device according to claim 1, wherein, based on a determination result that a number of times of detection of human movement detected by the sensor in the second length of time is equal to or less than a threshold value, the circuitry is configured to determine that the second condition is not satisfied, and inhibit the sensor from detecting a human movement for a third length of time.

3. A display apparatus comprising:
   a display; and
   circuitry configured to:
   supply power to the display;
   acquire a detection result of a person by a sensor disposed at the display;
   output a first determination result indicating whether a first condition is satisfied, the first condition being related to an operation receivable by the display apparatus;
   output a second determination result indicating whether a second condition is satisfied, the second condition being related to a situation around the display apparatus;

in a case where the detection result indicates that a person is detected in a state where the display apparatus is in a power saving mode, the power saving mode performed based on the operation received from a user, the power saving mode being a mode in which the power supplied to the display is reduced as compared with a normal mode;

set the sensor to an inactive state when the display apparatus is switched to the power saving mode;

determine that the first condition is satisfied based on a determination result that an elapsed time from switching to the power saving mode exceeds a first length of time;

set the sensor to a conditional active state when the elapsed time from switching to the power saving mode exceeds the first length of time;

determine, after setting the sensor to the conditional active state and after starting to count a second length of time, that the second condition is satisfied based on a determination result that a number of times of detection of human movement detected by the sensor is greater than a threshold value, wherein the sensor is set to the inactive state when the number of times of detection of human movement detected by the sensor after starting the second length of time is less than or equal to the threshold value;

set the sensor to an active state when an elapsed time of the second length of time has exceeded a predetermined period in the conditional active state without detecting the person; and cancel, after the sensor is set to the conditional active state, the power saving mode based on the first determination result outputted after the first length of time and the second determination result outputted during the second length of time, wherein the second length of time occurs after the first length of time is elapsed.

4. The display apparatus according to claim 3, wherein, based on a determination result that a number of times of detection of human movement detected by the sensor in the second length of time is equal to or less than a threshold value, the circuitry is configured to determine that the second condition is not satisfied, and inhibit the sensor from detecting a human movement for a third length of time.

* * * * *